United States Patent [19]
Benzon et al.

[11] 3,730,332
[45] May 1, 1973

[54] SCREW CONVEYOR COUPLING

[76] Inventors: Robert O. Benzon, 102 E. South Street; Richard K. Dybdal, 402 W. Center Street, both of Cambridge, Ill. 61238

[22] Filed: July 15, 1971

[21] Appl. No.: 162,907

[52] U.S. Cl....................................198/213, 287/2
[51] Int. Cl..........................B65g 33/32, E21b 17/02
[58] Field of Search..............198/213; 287/2, 103 R, 287/127 R

[56] References Cited

UNITED STATES PATENTS 3,104,757 9/1963 Dougherty et al....................198/213
2,630,341 3/1953 Downey.................................272/2

Primary Examiner—Edward A. Sroka
Attorney—Henderson and Strom

[57] ABSTRACT

A pair of interlocking coupling faces permits removal of a central bearing portion of a coupling in a direction perpendicular to the axis of conveyor screws. Each of two similar cylindrical end pieces of the coupling is secured within one of the adjacent ends of hollow conveyor screw shafts, and the outer ends of the end pieces have deep, wide slots that receive mating tongues of the ends of the central bearing portion. The bifurcated ends of the end pieces and the tongues are long enough to have bolts pass through them, but the bolts need merely to resist lateral displacement of the central portion because the driving torque is transmitted by the tongues.

1 Claim, 2 Drawing Figures

PATENTED MAY 1 1973  3,730,332

INVENTORS
ROBERT O. BENZON
RICHARD K. DYBDAL
BY
Henderson and Strom

SCREW CONVEYOR COUPLING

BACKGROUND OF THE INVENTION

This invention pertains to couplings for screw conveyors.

Commonly, each coupling for connecting together sections of a screw conveyor comprise a single, solid cylindrical shaft with a central bearing surface. The ends of the couplings fit quite tightly in the ends of the shafts to which helices of the screws are mounted, and the couplings are secured at each end by two bolts that extend through the shafts and the couplings. In order to replace a worn coupling, the sections extending from that coupling to one of the ends of the conveyor must be loosened and moved axially to provide clearance. Since the torque for driving the shafts is transmitted through the bolts, the mounting holes for the bolts are likely to become oval because of wear.

The shafts and the couplings have both been modified in various ways to permit removal of the couplings without moving the shafts of the conveyor sections axially. For example, U.S. Pat. No. 2,849,105 issued to L.L. Touton on Aug. 26, 1958 shows shafts having slots that permit the couplings to be removed through the slots in a direction perpendicular to the axis of the shafts. The slots in the shafts are normally closed by filler blocks, and bolts pass through the slotted shafts, the couplings, and the filler blocks. The torque for driving the shafts is transmitted through the bolts as is the torque in couplings having simple tubular shafts. Another coupling is shown in U.S. Pat. No. 1,016,748 issued to B.F. Howland on Feb. 6, 1912; the filler blocks or caps shown in this invention have keys on the inner side of the caps to engage grooves in the shafts. Through this arrangement, the torque is transmitted through the keys and the attached caps to the shafts.

A coupling that has interlocking, complementary faces rather than bolts for transmitting torque is described in U.S. Pat. No. 2,630,341 issued to F.P. Downey on Mar. 3, 1953. This coupling resembles an Oldham's coupling in that shanks that fit in the ends of the shafts of the conveyor screw are terminated in disks that have substantially larger diameters than the shanks, and each of the disks has across its face a relatively shallow groove for receiving a tongue that is on the face of the disk of an intermediate bearing portion. Unlike an Oldham's coupling, the faces of the disks of the intermediate portion are separated by a spindle, and the diametral tongues that slide into the grooves on the end pieces lie in the same plane rather than being directed perpendicularly. Since the tongues and the grooves are in the same plane, the central portion with the tongues can be inserted in a diametral direction. After the intermediate bearing portion is in place, collars are positioned about the mating disks for retaining the assembly in place.

SUMMARY OF THE INVENTION

An object of this invention is to provide for a screw conveyor, an easily replaceable coupling that is inexpensive to manufacture.

The coupling comprises three short shafts, two similar end shafts, and an intermediate bearing shaft. A cylindrical end of each of the end shafts is secured within the hollow end of one of the conveyor shafts to be coupled, and the other end of each end shaft has a deep wide slot for receiving tightly a complementary tongue at the end of the intermediate bearing shaft. The corresponding sides of the tongues at the ends of the intermediate bearing shaft lie in the same planes so that the intermediate bearing shaft can be inserted or removed in a diametral direction. The tongues fit tightly in the slots or cutouts and transmit torque from one shaft to the other. In order to resist a much smaller force tending to move the tongues laterally out of their grooves, a bolt is inserted through the bifurcated portions of each of the end coupling shafts and the respective tongue. Only a minimum amount of disassembly of the screw conveyor is required before replacing a coupling; the couplings can transmit high torque; and the couplings can be readily fabricated from round bar stock.

DESCRIPTION OF THE PREFERRED EMBODIMENT

Figure 1:
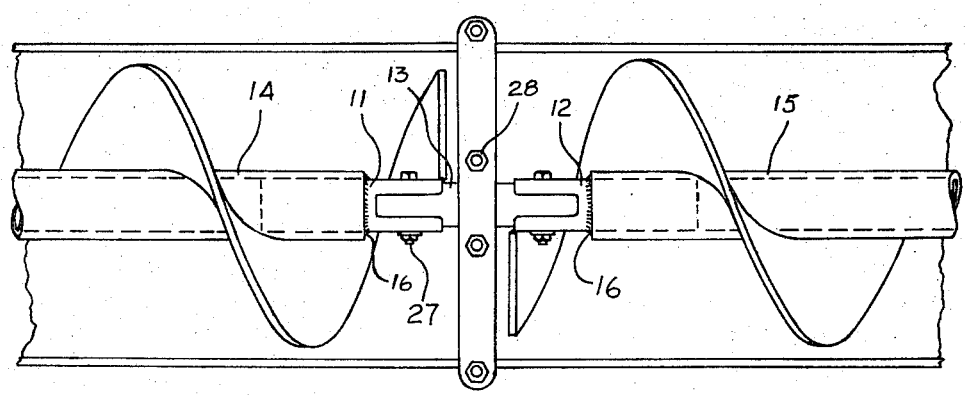
FIG. 1 is a fragmentary top view of a screw conveyor to show the coupling of this invention assembled between two shafts of successive sections of a conveyor.

With reference to FIG. 1, each of two similar, short end shafts 11 and 12 has a cylindrical end mounted within a respective hollow shaft 14 and 15 of successive conveyor screws, and has a slot in the other end to be engaged by a tongue on an intermediate bearing shaft 13. The shaft 13 has a tongue 18 at each of its ends to fit tightly into the respective slot of one of the end mounting shafts 11 and 12. The shafts 11 and 12 fit tightly into the respective conveyor screw shafts 14 and 15, and in addition are secured by the welds 16 at the ends of the conveyor screw shafts. Additional strength can be obtained by providing holes through those portions of the conveyor screw shafts 14 and 15 that are to receive the end shafts 11 and 12 and then welding through the holes after the shafts are assembled. The ends of the helices attached to the conveyor screw shafts 14 and 15 extend to the outer ends of the end shafts 11 and 12 and the extreme ends are preferably welded.

Figure 2:
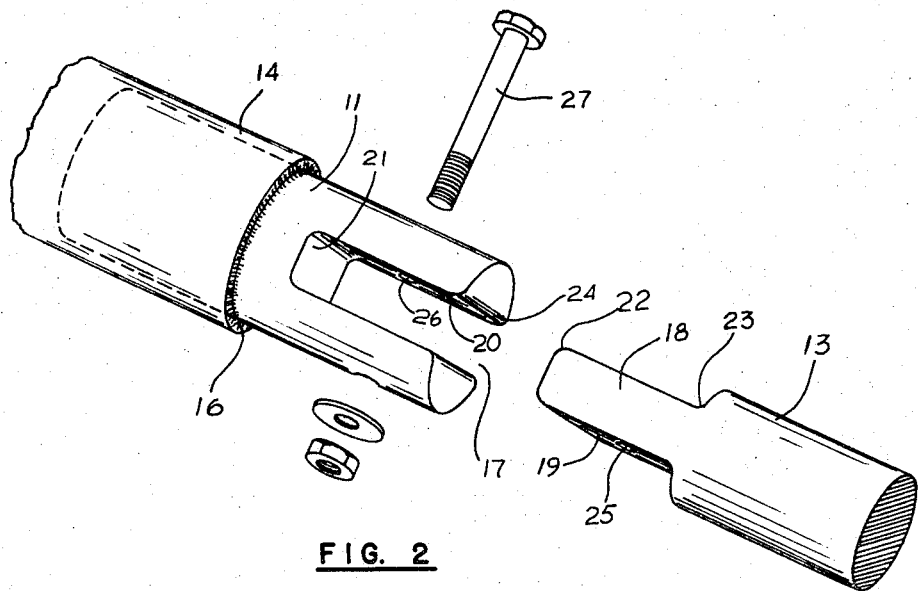
FIG. 2 is an oblique view of one of the mating portions of the coupling.

With reference to FIG. 2, the slot or cutout 17 extending inwardly in a direction perpendicular to the face of each of the short end mounting shafts 11 and 12 is approximately one-third as wide as the diameter of the shafts so that the bifurcated ends of the shafts 11 and 12 and the tongues 18 of the intermediate bearing portion 13 have about maximum strength. Also, the length of the cutouts in the direction of the axis of the mounting shafts 11 and 12 is sufficient to permit bolts or other fastening means to be positioned diametrally through the bifurcated portions of the short end shafts 11 and 12 and the mating tongues 18 of the bearing portion 13.

The cutout 17 and the tongue 18 are symmetrical with respect to the axis of the shafts, and the opposite faces 19 of the tongue 18 and the opposite faces 20 forming the slot 17 are parallel. The faces 19 of the tongue 18 fit tightly between the faces 20, but the fit is not so tight but what the tongues 18 can be pressed into place within their slots 17 in a direction perpendicular to the axis of the shafts.

Although the tongue 18 and the space comprising the slot 17 are generally rectangular, the inner corners 21 within the slot 17 are rounded to strengthen the coupling, and the outer corners 22 of the tongue 18 are likewise rounded to fit within the rounded corners 21. Also, the inner corners 23 of the tongue 19 and the mating corners 24 of the bifurcated ends of the mounting shafts 11 and 12 are rounded to provide additional strength. Mating holes 25 and 26 for fasteners extend diametrally through the bifurcated portions of the end shafts 11 and 12 and through the tongues 18. The bearing portion 13 of the coupling has a usual bearing surface to fit within the bearings of a conventional hanger that is supported from the top of the trough of the screw conveyor.

In order that all sections of a screw conveyor can have slotted ends according to this invention, the screw conveyor with speed reducers that are commonly supplied with the conveyors ought to be supplied with output shafts having tongues with the right dimensions to fit in the slots in the ends of the screw conveyor shafts similar to shafts 14 and 15. Also, the trough ends fitted in the ends of the troughs opposite their drive ends are to be fitted with shafts that have troughs that fit within the slots.

To replace a worn intermediate bearing portion 13, the conveyor is rotated until the fastening bolts 27 are readily accessible for removal. The lower cap of the bearing at the coupling that is to be repaired is removed; for example, in FIG. 1 the nuts 28 of a U-bolt are removed. After the bolts 27 are removed, the intermediate bearing portion 13 of the shaft is then removed by pressing it, or if necessary, by driving it in a diametral direction. The new bearing portion is then replaced in a reverse order.

We claim:
1. In a screw conveyor of the type having a plurality of conveyor screws coupled in series, the ends of the shaft of each of the conveyor screws being tubular;
   a conveyor coupling interconnecting any two successive ones of said conveyor screws comprising: first and second end portions and an intermediate bearing position, one end of each of said end portions being cylindrical and being fitted tightly into and rigidly secured in a respective one of the adjacent ends of two of said shafts that are interconnected, said intermediate bearing portion having a central cylindrical bearing surface, the other end of each of said end portions and the adjacent end of said intermediate bearing portion comprising a pair of interlocking ends that are engageable to prevent rotary motion therebetween, one of each of said interlocking pairs of ends having a flat tongue with parallel sides and the other end of each of said interlocking pairs of ends having a central cutout to form parallel faces of a slot extending fully across said respective other end of said interlocking pairs of ends, each of said tongues being a tight sliding fit between the parallel faces of the slot of the respective one of said pair of interlocking ends, removable fastening means, said tongues and said other ends of said interlocking ends adjacent said respective slots having sufficient length and thickness to provide required strength nd to provide space for drilling holes for inserting said fastening means perpendicularly therethrough, the tongues of said conveyor coupling when engaged being symmetrical with the axis of said shafts and the corresponding ones of said parallel sides of the tongues of said coupling lying in a single plane to facilitate removal of said intermediate bearing portion in either direction parallel to said faces of said slots and perpendicular to said axis of said shafts.

* * * * *